(12) United States Patent
Lyon et al.

(10) Patent No.: US 6,357,917 B1
(45) Date of Patent: Mar. 19, 2002

(54) THIN-WALLED BEARINGS

(75) Inventors: John Lyon, Prestwick; Fatima Rutherford, Stewarton, both of (GB)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/180,532

(22) PCT Filed: Apr. 25, 1997

(86) PCT No.: PCT/GB97/01143

§ 371 Date: Nov. 10, 1998

§ 102(e) Date: Nov. 10, 1998

(87) PCT Pub. No.: WO97/43555

PCT Pub. Date: Nov. 20, 1997

(30) Foreign Application Priority Data

May 15, 1996 (GB) .............................. 9610096

(51) Int. Cl.⁷ .............................................. F16C 33/06
(52) U.S. Cl. ..................... 384/276; 384/294; 384/912
(58) Field of Search ................................ 384/294, 276, 384/288, 273, 912

(56) References Cited

U.S. PATENT DOCUMENTS

| | | | |
|---|---|---|---|
| 4,470,184 A | 9/1984 | Fukuoka et al. | 427/383.7 |
| 5,116,692 A | 5/1992 | Mori et al. | 428/650 |
| 5,209,578 A * | 5/1993 | Eastham et al. | 384/276 |
| 5,879,816 A * | 3/1999 | Mori et al. | 384/913 |
| 6,045,929 A * | 4/2000 | Eastham et al. | 384/912 |

FOREIGN PATENT DOCUMENTS

| | | |
|---|---|---|
| GB | 2156011 A | 10/1985 |
| JP | 61186499 | 8/1986 |
| JP | 63101516 | 5/1988 |

OTHER PUBLICATIONS

International Search Report for PCT/GB 97/01143 mailed Sep. 9, 1997.

* cited by examiner

*Primary Examiner*—Lenard A. Footland
(74) *Attorney, Agent, or Firm*—Rader, Fishman & Grauer PLLC

(57) ABSTRACT

Thin-walled bearings (10) each including a layer (16) of an aluminium based, or copper based, bearing material bonded to a steel shell, has an overlay (20) of one or more of the elements lead, tin, indium, copper, nickel, zinc and antimony. A flash (24) less than two micrometers thick and of one or more of the elements iron, chromium, nickel, cobalt, gold, silver and copper, is provided in any convenient way on the initially unmodified exposed surface portion of the overlay. The flash (24) is caused to react with the, or at least one constituent, element of the overlay (20) to modify the surface portion (22) of the overlay to become hard and wear-resistant. The material of the flash (24) forms at least one intermetallic compound, and/or solid solution, with the material of the surface portion (22) of the overlay (20). The bearing may be heated to a temperature at which the flash (24) reacts with the overlay (20) to form the required intermetallic compound, and/or solid solution, at a desired rate.

11 Claims, 1 Drawing Sheet

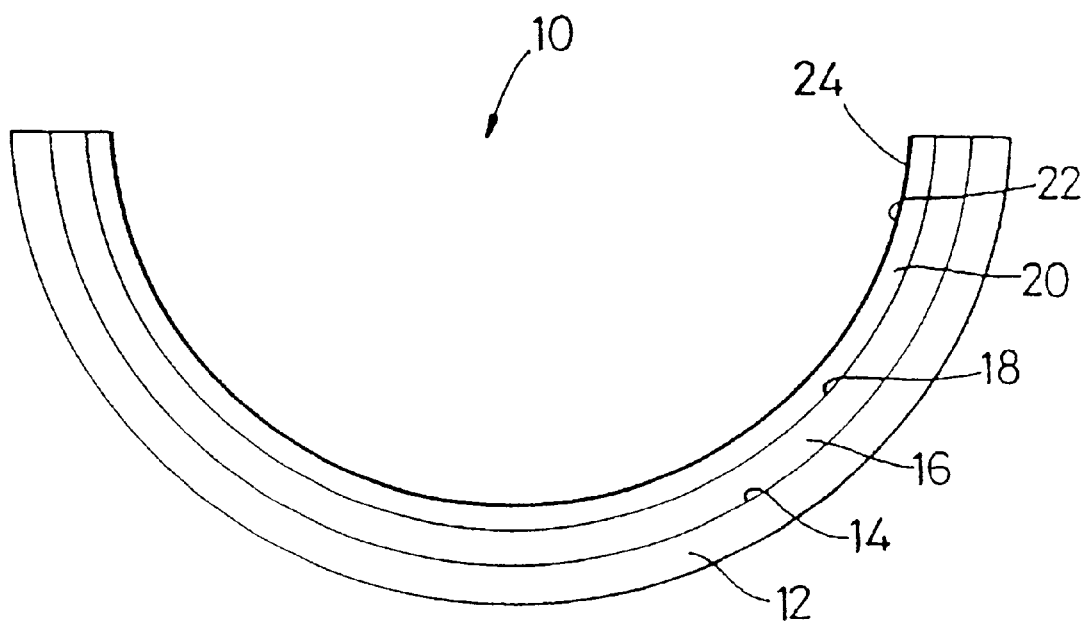

THIN-WALLED BEARINGS

This invention relates to thin-walled bearings, in particular but not essentially for automotive use.

Conventionally such a thin-walled bearing comprises a layer of bearing material bonded to the inner surface of a curved steel shell. The present invention further relates to a thin-walled bearing in which the bearing material is either aluminium based or copper based, and may be cast, sintered or roll bonded onto the steel shell. A typical thickness for the bearing layer is 250 micrometers.

It is also conventional that for a copper based bearing material, and sometimes for an aluminium based bearing material, an overlay, say of a thickness of 20 micrometers, is applied to the bearing layer, say by being electro-deposited on the bearing layer. The purpose of the overlay is to prevent the bearing material, especially when it includes copper, from seizing with a steel shaft journalled in the bearing; and/or to conform to the eccentricities of the shaft. Usually, in the operation of the bearing, the bearing layer becomes partially exposed through the overlay because of wear of the overlay, but the presence of even a partial overlay imparts the required properties to the bearing. Examples of overlay material which are employed are lead-10% tin, lead-7% indium and lead-tin-2–4% copper.

Properties required for both the bearing material, and the overlay material, are resistance to corrosion, and a high fatigue strength.

It is also known to electro-deposit a intermediate layer of nickel, upto two micrometers thick, on a cast layer of bearing material. Such an intermediate layer is provided to prevent bond failure between the bearing material and a subsequently electro-deposited overlay. A disadvantage of such bearings is that if a steel shaft wears away the overlay, so that the intermediate nickel layer is at least partially exposed, then seizure with the steel shaft can occur.

It is to thin-walled bearings having an overlay, and possibly also an intermediate nickel layer, as referred to above, that, in particular, the present invention relates.

It is an object of the present invention to provide a thin-walled bearing, for example for automotive use, which has a desirably long operating life; and which has a desirably close fit with a co-operating shaft for optimum performance.

In accordance with the present invention a thin-walled bearing including a layer of an aluminium based, or copper based, bearing material bonded to the inner surface of a curved steel shell, has an overlay, the overlay is of at least one of the elements lead, tin, indium, copper, nickel, zinc and antimony, and from a reaction of a flash less than two micrometers thick and of at least one of the elements iron, chromium, nickel, cobalt, gold, silver and copper, with the, or at least one constituent, element of the overlay, there is formed a modified, hard, wear-resistant, exposed surface portion of the overlay.

The flash is reacted, or combined, with the, or at least one constituent, element of the overlay so as to form at least one intermetallic compound; and/or to form at least one solid solution corresponding to, and possibly softer than, the intermetallic compound or compounds.

The modified, hard, wear-resistant, exposed surface portion of the overlay is also required to have seizure resistance, and fatigue strength not significantly lower than the unmodified major part of the overlay. The hardness of the surface portion is not conducive to it conforming to the eccentricities of a cooperating shaft, but because this portion is so thin its presence is not significantly detrimental to the effective conformability of the whole of the overlay with the modified, hard surface portion.

The flash may have combined, or reacted, in the required manner with the, or at least one constituent, element of the overlay by having been heated to a temperature which permits diffusion and alloying between the overlay and the flash at a desired rate.

It is unimportant if such good seizure resistant, and hard, wear-resistant, parts of the exposed surface portion of the overlay are discontinuous, possibly as a result of the portion being partially worn away during the operation of the bearing.

According to another aspect the present invention comprises a method of manufacturing a thin-walled bearing, which bearing includes a layer of an aluminium based, or copper based, bearing material bonded to the inner surface of a curved steel shell, and on the bearing layer is bonded an overlay of at least one of the elements lead, tin, indium, copper, nickel, zinc and antimony, and the method includes providing, in any convenient way, on the initially unmodified, exposed, surface portion of the overlay a flash less than two micrometers thick and of at least one of the elements iron, chromium, nickel, cobalt, gold, silver and copper, and reacting the material of the flash with the, or at least one constituent, element of the overlay, to form a modified hard, wear-resistant exposed surface portion of the overlay.

The present invention will now be described by way of example with reference to the accompanying drawing which is a side view of a thin-walled bearing in accordance with the present invention.

The illustrated thin-walled bearing 10 includes a curved steel shell 12, and on the radially inner surface 14 of the shell 12 is bonded a layer 16 of bearing material. Directly onto the radially inner surface 18 of the bearing layer 16 is electro-deposited an overlay 20. Alternatively, an intermediate layer of nickel (not shown) is provided between the layer 16 of bearing material and the overlay 20, to prevent bond failure between these two layers.

The thin-walled bearing 10 as described so far has a conventional construction, and is of conventional constituent materials.

The bearing material 16 is aluminium based, or copper based, for example, copper-lead, or aluminium-tin, or aluminium-tin-silicon. Typically, the bearing layer 16 has a thickness of 250 micrometers.

The thickness of the overlay 20 typically is in the range 12 to 33 micrometers, and may be 20 micrometers. The overlay 20 is provided when the bearing material 16 is copper based, and sometimes when the bearing material is aluminium based. The overlay 20 is required to be seizure resistant with a shaft (not shown) journalled in the bearing, and is required to conform to eccentricities of the shaft.

In accordance with the present invention, on the initially unmodified, exposed surface 22 of the overlay 20 is provided a flash (not shown), the flash initially not being considered to be part of the overlay. The flash is caused to react, or combine, with the previously provided material of a surface portion 24 of the overlay 20, to modify the surface portion 24 to become hard and wear-resistant, in addition to being seizure resistant.

The previously deposited material of the overlay 20 is of at least one of the elements lead, tin, indium, copper, nickel, zinc and antimony. The material of the flash is of at least one of the elements iron, chromium, nickel, cobalt, gold, silver and copper. The flash may be deposited in any convenient manner, for example, by electro-deposition, or chemical vapour deposition, or physical vapour deposition. The required reaction of the flash with the previously deposited overlay material may occur simultaneously with the deposition of the flash, or may be in a subsequent heat-treatment process step.

The hard, modified, surface portion 24 is seizure resistant because the material of the flash reacts with the, or at least one constituent, element of the previously electro-deposited material of the overlay 20, to form at least one intermetallic compound and/or solid solution. The required modification may be obtained by heating the bearing to a temperature at which the flash combines with the, or at least one of the constituent, elements of the previously electro-deposited overlay material at a desired rate.

EXAMPLE

In one particular example of the manufacture of a thin-walled bearing in accordance with the present invention the initially deposited overlay material is lead-indium, the two elements being deposited in separate electro-deposition process steps, with lead being deposited first. The required modified surface portion 24 of the overlay is obtained be depositing a nickel flash immediately after the deposition of the indium. The flash of nickel, approximately one-third of a micrometer thick, is provided in a further electro-deposition process step. Then by heat-treatment, for example, at a temperature of 160° C. for about 20 minutes, the nickel is caused to be diffused into the indium of the overlay, to form at least one required intermetallic compound and/or solid solution. In this way a hard, wear-resistant modified surface portion 24 is provided for the overlay, which surface portion is also seizure resistant, and has a high fatigue strength. The modified surface portion 24 of the overlay may be thicker than the flash, and may have a thickness upto two micrometers, although usually this thickness is less than one micrometer.

When the overlay is of tin; or of lead, tin and copper, which conventionally is provided with a flash of tin considered to be part of the overlay; the subsequent nickel flash provided on the overlay is required to form the required intermetallic compound, and/or solid solution, at a temperature below the melting point of tin, say, at a temperature of 160° C.

The hardness of the thin surface portion of the overlay does not adversely affect the required conformability of the overlay considered as a whole.

The flash of nickel can have a thickness of upto two micrometers, commensurate with the thin modified surface portion of the overlay having the required conformability.

It is immaterial if, because of wear in the operation of the bearing, or otherwise, the required hardness of the modified surface portion is discontinuous within the surface portion.

What is claimed is:

1. A bearing, comprising:
   a curved steel shell having an inner surface;
   a bearing layer having an inner surface, the bearing layer bonded to the inner surface of the curved steel shell and comprising one of an aluminum and a copper material;
   an overlay having an exposed surface portion, the overlay bonded to the inner surface of the bearing layer and comprising one of lead, tin, indium, copper, nickel, zinc and antimony material; and
   a flash deposited on the exposed surface portion of the overlay, the flash comprising one of iron, chromium, nickel, cobalt, gold, silver and copper material,
   wherein the flash is caused to react with the exposed surface portion of the overlay to modify a hardness of the exposed surface portion of the overlay.

2. The bearing according to claim 1, wherein the flash increases the hardness of the exposed surface portion of the overlay.

3. The bearing according to claim 1, wherein the flash has a thickness of up to two micrometers.

4. The bearing according to claim 1, wherein the overlay has a thickness between 12 and 33 micrometers.

5. The bearing according to claim 1, wherein the flash is caused to react with the exposed surface portion of the overlay by heating the flash for to a predetermined temperature for a predetermined period of time.

6. The bearing according to claim 5, wherein the flash is heated to a temperature of 160° C. for about 20 minutes.

7. A bearing, comprising:
   a curved steel shell having an inner surface;
   a bearing layer having an inner surface, the bearing layer bonded to the inner surface of the curved steel shell and comprising at least one element from the group consisting of aluminum and copper;
   an overlay having an exposed surface portion, the overlay bonded to the inner surface of the bearing layer and comprising at least one element from the group consisting of lead, tin, indium, copper, nickel, zinc and antimony; and
   a flash deposited on the exposed surface portion of the overlay, the flash comprising at least one element from the group consisting of iron, chromium, nickel, cobalt, gold, silver and copper,
   wherein at least one element of the flash is caused to react with at least one element of the exposed surface portion of the overlay to increase a hardness of the overlay.

8. The bearing according to claim 7, wherein the flash has a thickness of up to two micrometers.

9. The bearing according to claim 7, wherein the overlay has a thickness between 12 and 33 micrometers.

10. The bearing according to claim 7, wherein the flash is caused to react with the exposed surface portion of the overlay by heating the flash to a predetermined temperature for a predetermined period of time.

11. The bearing according to claim 10, wherein the flash is heated to a temperature of 160° C. for about 20 minutes.

* * * * *